June 26, 1928.
C. S. KELLEY
PROCESS OF MAKING DIAPHRAGMS
Filed June 20, 1927
1,674,781
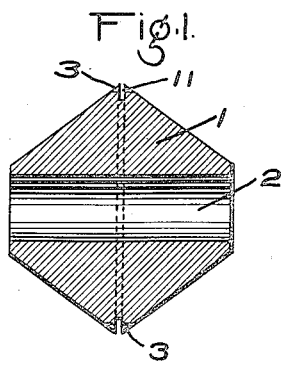
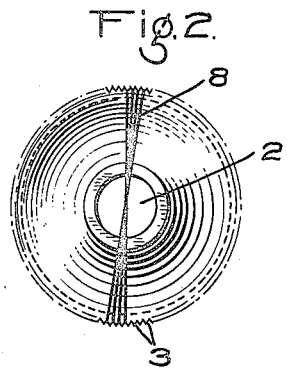
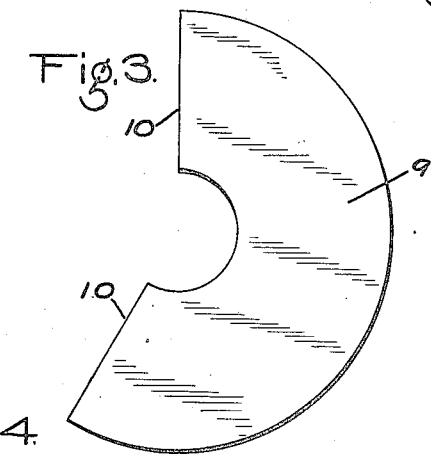
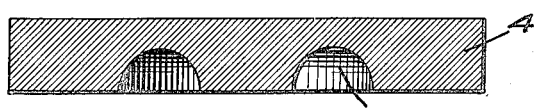
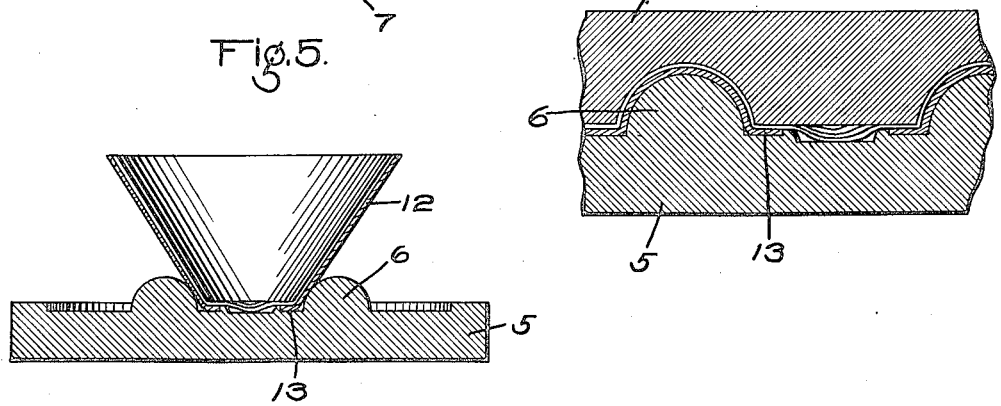
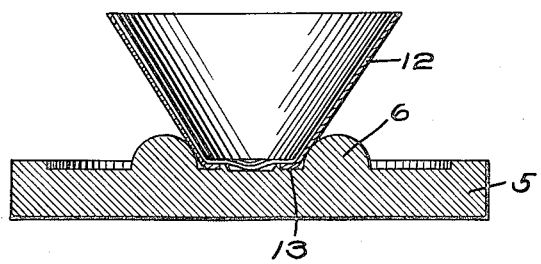
INVENTOR
CECIL S. KELLEY
BY Wm. M. Cady
ATTORNEY Patented June 26, 1928.

1,674,781

UNITED STATES PATENT OFFICE.

CECIL S. KELLEY, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PROCESS OF MAKING DIAPHRAGMS.

Application filed June 20, 1927. Serial No. 200,019.

This invention relates to a process for making flexible diaphragms of the reinforced cord type, such as covered in my prior pending application, Serial No. 67,615, filed November 7, 1925.

In the accompanying drawing; Fig. 1 is a section of the form on which the reinforcing cord is wound; Fig. 2 a plan view of the form, showing the method of winding the cord; Fig. 3 a plan view of one of the rubber blanks employed in making the diaphragm; Fig. 4 a sectional view of the female portion of the gasket forming mold; Fig. 5 a sectional view of the male portion of the mold, showing the partly formed gasket applied thereto; and Fig. 6 a fragmentary sectional view of the mold, with the male and female portions pressed together.

In order to make a gasket in accordance with my improved process, a form 1 is provided, which consists of two truncated cones having a common base, as shown in Fig. 1. The form has a central opening 2 and the median periphery of the form is provided with notches 3 as shown in Fig. 3.

A mold is also provided, which comprises a female portion 4 and a male portion 5 and in making a diaphragm of the type having an annular U shaped fold, the male portion of the mold is provided with an annular head 6 corresponding in section with the section of the interior of the fold of the diaphragm. The female portion 4 is provided with an annular recess 7 which is adapted to fit over the head 6 when the parts of the mold are clamped together.

In order to make a diaphragm, suitable reinforcing cord 8 is first wound around the form 1, so that successive windings engage successive notches 3 in the form, as shown in Fig. 2, the windings crossing at the center of the opening 2. When the cord has been wound all the way around, the ends of the cord are brought together at the center of the opening 2 and are tied.

Rubber composition blanks 9, shaped as shown in Fig. 3, are then rolled up with the edges 10 abutting, so as to form truncated cones, and then the interior of the cones are softened with benzol or a similar softening agent. A cone of rubber composition so formed is then applied to each of the truncated cone portions of the form and are pressed against the form, so that the cord 8 is embedded in the rubber. The cone of reinforced rubber extends beyond the outer end of the form 1 and the extended portion is bent down with the fingers against the end face of the form so that a flange 13 is formed at the small end of the rubber cone as shown in Fig. 5.

The cord 8 is then cut with a knife at the notches 3, the periphery of the form being provided with an annular groove 11 to facilitate the cutting of the cords. The two truncated cone shaped gasket sections thus formed are then removed from the form.

A gasket section 12, formed as above described, is then placed in the male portion 5 of the mold, with the smaller end of the cone engaging in the annular space within the head 6 the flange 13 fitting into a corresponding recess in the male portion of the mold, as shown in Figs. 5 and 6.

The diaphragm section is then pressed down by hand, so as to roughly fit the contour of the male portion of the mold and then the female portion 4 of the mold is applied.

Pressure is then applied to the female portion 4 by any suitable means.

The diaphragm is then vulcanized or cured and the central portion of the diaphragm is punched out to remove the crossed cords and leave a central hole through the diaphragm.

Having now described my invention, what I claim as new and desire to secure by Letters Patent, is:—

1. The method of making a flexible diaphragm having radially disposed reinforcing cords which consists in winding a cord on a form, shaped as a truncated cone, in then applying to the truncated cone a rubber composition cone, and then pressing the rubber cone into engagement with the cord.

2. The method of making a flexible diaphragm having radially disposed reinforcing cords which consists in winding a cord on a form, shaped as a double truncated cone, in then applying to each truncated cone, a truncated cone of sheet rubber, severing the cords extending between the truncated cones, and then removing the rubber and cord structures.

3. The method of making a flexible diaphragm having radially disposed reinforcing cords which consists in winding a cord on a form, shaped as a truncated cone, then applying a truncated cone of rubber composition to said form, pressing the truncated cone of rubber composition into the cord, removing the cord and rubber composition structure, and then developing the truncated cone structure into the diaphragm form.

4. The method of making a flexible diaphragm having radially disposed reinforcing cords which consists in winding a cord on a form, shaped as a truncated cone, then applying a truncated cone of rubber composition to said form, pressing the truncated cone of rubber composition into the cord, removing the cord and rubber composition structure, developing the truncated cone structure into the daphragm form, and then subjecting the structure to pressure in a mold.

5. The process of making a flexible diaphragm having radially disposed cords and having an annular fold which consists in forming a truncated cone of rubber composition with radial cords embedded therein, in placing said cone in a mold and pressing the cone into a diaphragm having an annular fold.

6. The process of making a flexible diaphragm having radially disposed cords and having an annular fold which consists in forming a truncated cone of rubber composition with radial cords embedded therein, in placing said cone in the male portion of a mold having an annular head, in working the cone to conform to the face of the male portion of the mold and in then applying the female portion of the mold.

7. The proces of making a flexible diaphragm having radially disposed cords and having an annular fold which consists in forming a truncated cone of rubber composition with radial cords embedded therein, in placing said cone in the male portion of a mold having an anular head, in working the cone to conform to the face of the male portion of the mold and in then applying the female portion of the mold, and subjecting the mold to pressure.

8. The process of making a flexible diaphragm having radially disposed cords and having an annular fold which consists in forming a truncated cone of rubber composition with radial cords embedded therein, in placing said cone in the male portion of a mold having an annular head, in manually working the cone to engage the surface of the head, then applying the female portion of the mold and then applying pressure to the mold.

In testimony whereof I have hereunto set my hand.

CECIL S. KELLEY.